(12) United States Patent
Carr

(10) Patent No.: US 6,557,172 B1
(45) Date of Patent: Apr. 29, 2003

(54) COMMUNICATING ENHANCEMENT DATA IN LAYERS

(75) Inventor: Wayne J. Carr, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/382,308

(22) Filed: Aug. 24, 1999

Related U.S. Application Data

(63) Continuation-in-part of application No. 09/321,939, filed on May 28, 1999, and a continuation-in-part of application No. 09/370,526, filed on Aug. 6, 1999.

(51) Int. Cl.$^7$ .......................... H04N 7/16; H04N 5/445; H04N 7/025
(52) U.S. Cl. ........................... 725/139; 725/32; 725/50; 725/136
(58) Field of Search ........................... 725/95, 32, 100, 725/131, 132, 139, 140, 151, 152, 135, 136, 138, 50, 80

(56) References Cited

U.S. PATENT DOCUMENTS

| | | | |
|---|---|---|---|
| 5,585,858 A | * 12/1996 | Harper et al. | 348/485 |
| 6,014,694 A | * 1/2000 | Aharoni et al. | 709/219 |
| 6,263,506 B1 | * 7/2001 | Ezaki et al. | 725/116 |

FOREIGN PATENT DOCUMENTS

| | | | |
|---|---|---|---|
| WO | WO 97 30549 | | 8/1997 |
| WO | WO 97/30549 | * | 8/1997 |

OTHER PUBLICATIONS

Advanced Television Enhancement Forum Specification (ATVEF), Comment Draft Version 1.0r1, 1–20, printed from web site http://www.atvef.com/atvef_spec/TVE–public.htm (Oct. 18, 1998).

Intel Corporation, Internet Intercast™ Technology, 1–29, printed from web site http://developer.intel.com/drg/hybrid_author/cookbooks/intercast/01.html#1, dated at least as early as Jun. 2, 1998.

Paragon Cable, Cable Modem FAQ, 1–7, printed from web site http://www.paragonpdx.com/cablemod.html, dated at least as early as Feb. 16, 1999.

Intel Corporation, Digital Broadcast Technology, What Is Intel Doing to Lead the Way to Digital? 1–3, printed from web site http://developer.intel.com/drg/dbt/what_int.htm, dated at least as early as Dec. 29, 1998.

Whatis.com, Inc., DOCSIS (Data Over Cable Systems Interface Specification), 1, printed from web site http://whatis.com/docsis.htm (Nov.12, 1998).

(List continued on next page.)

*Primary Examiner*—John Miller
*Assistant Examiner*—Johnny Ma
(74) *Attorney, Agent, or Firm*—Trop, Pruner & Hu, P.C.

(57) ABSTRACT

A system includes a content creator, a transmitting source, and a receiver platform for communicating enhancement data associated with audio/video content according to a protocol without layering capability. A receiver platform detects for a first announcement and a second announcement, the first announcement being associated with non-layered enhancement data, and the second announcement being associated with layered enhancement data having a plurality of layers. Each layer includes one or more sources of trigger files or one or more sources of resource files. Alternatives presented in the second announcement are examined, the alternatives containing different collections of the layers of enhancement data. One of the alternatives in the second announcement is selected based on the capacity of the second receiver platform. One or more layers containing respective trigger files and resource files associated with the selected alternative are received. The enhancement data may include enhancement data according to an Advanced Television Enhancement Forum Specification.

13 Claims, 5 Drawing Sheets

OTHER PUBLICATIONS

Intel Corporation, How Intel® Intercast® Technology Works, 1–2, printed from web site http://www.intercast.com/intercast/howitwks.htm, dated at least as early as Jul. 15, 1998.

Multicast Transport Protocol, Request for Comments 1301, 1–35, printed from web site ftp://ftp.isi.edu/in–notes/rfc1301.txt (Feb. 1992).

StarBurst Software Press Release, Starburst Omnicast Provides First Software–Based Content Distribution Solution for One–Way Satellite Networks, 1–3, printed from web site http://www.starburstcom.com/pr_fec.htm. (Feb. 1, 1999).

Starburst Software, Starburst MFTP—An Efficient, Scalable Method for Distributing Information Using IP Multicast, 1–7, printed from web site http://www.starburstcom.com/white.htm. (1998).

AT&T News Release, Starburst Offer Reliable Satellite–Based Multicasting, 1–2, printed from web site http://www.att.com/press/0496/960402.bsb.html. (Apr. 2, 1996).

Advanced Television Enhancement Forum Specification (ATVEF), Draft Version 1.1r26, 1–32, printed from web site http://www.atvef.com/atvef_spec/TVE–public.htm (Feb. 2, 1999).

* cited by examiner

COMMUNICATING ENHANCEMENT DATA IN LAYERS

CROSS-REFERENCE TO RELATED APPLICATIONS

This application is a continuation-in-part of U.S. Ser. No. 09/321,939, filed May 28, 1999, entitled "COMMUNICATING ANCILLARY INFORMATION ASSOCIATED WITH A PLURALITY OF AUDIO/VIDEO PROGRAMS" and U.S. Ser. No. 09/370,526, filed Aug. 6, 1999, entitled "RELIABLE COMMUNICATION OF DATA BY SUPPLEMENTING A UNIDIRECTIONAL COMMUNICATIONS PROTOCOL."

BACKGROUND

The invention relates to communicating enhancement data associated with audio/video content in multiple layers.

Ancillary information, such as program sub-titles, emergency messages, closed caption messages, and program guide information, may be transmitted along with regular television content. More recently, other types of ancillary information that may be sent with television content include enhancement data such as web pages, multimedia information, or other digital data files. Ancillary information may be sent in the vertical blanking interval (VBI) of an analog television broadcast signal or sent with digital television content over a digital transmission transport medium.

Various standards exist that provide for transmission of ancillary information along with television content. One standard is the Advanced Television Enhancement Forum (ATVEF) Specification, Draft Version 1.1r26, dated Feb. 2, 1999. The ATVEF specification is designed to provide for transmission of enhancement data along with television content in both analog and digital systems, such as cable systems, satellite systems, terrestrial systems, and so forth.

The amount of enhancement data or other types of ancillary information that can be received by a receiving platform depends largely on its capabilities (including storage, processing, and data transfer rate capabilities, for example). Different receiving platforms may have different capabilities. For example, some relatively low-capacity receiving platforms such as earlier version set-top boxes may have a relatively low bandwidth for receiving ancillary information. To ensure receipt of ancillary information by as large an audience as possible, content creators may reduce the amount of ancillary information in a transmission to target such low-capacity receiver platforms. The assumption may be that such platforms are being used by the greatest number of viewers. Thus, the quality of, and features available in, enhancement data or other types of ancillary information may be limited to accommodate the relatively low-capacity receiving platforms. This may limit options that may be offered the audience.

SUMMARY

In general, according to one embodiment, a method for communicating enhancement data associated with audio/video content includes receiving, in a receiver system, enhancement data. The enhancement data is associated with a plurality of alternatives each including one or more layers of enhancement data. One of the alternatives is selected based on the capacity of the receiver system, and the one or more layers associated with the selected alternative are received.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible. For example, although reference is made to a version of the Advanced Television Enhancement Forum (ATVEF) Specification, Draft Version 1.1r26, dated Feb. 2, 1999, it is contemplated that other versions of the ATVEF Specification or other standards and techniques for transmission of ancillary information with content that includes audio data or video data (e.g., television content) may be included in further embodiments.

As used in this description, the term audio/video (A/V) content is intended to include any type of audio and/or video data that may be transmitted or distributed to one or more receiving sites for presentation to viewers and/or listeners. An example of A/V content is television content. As used here, A/V content may refer to content that may include both an audio and video portion or one of an audio and video portion.

Figure 1:
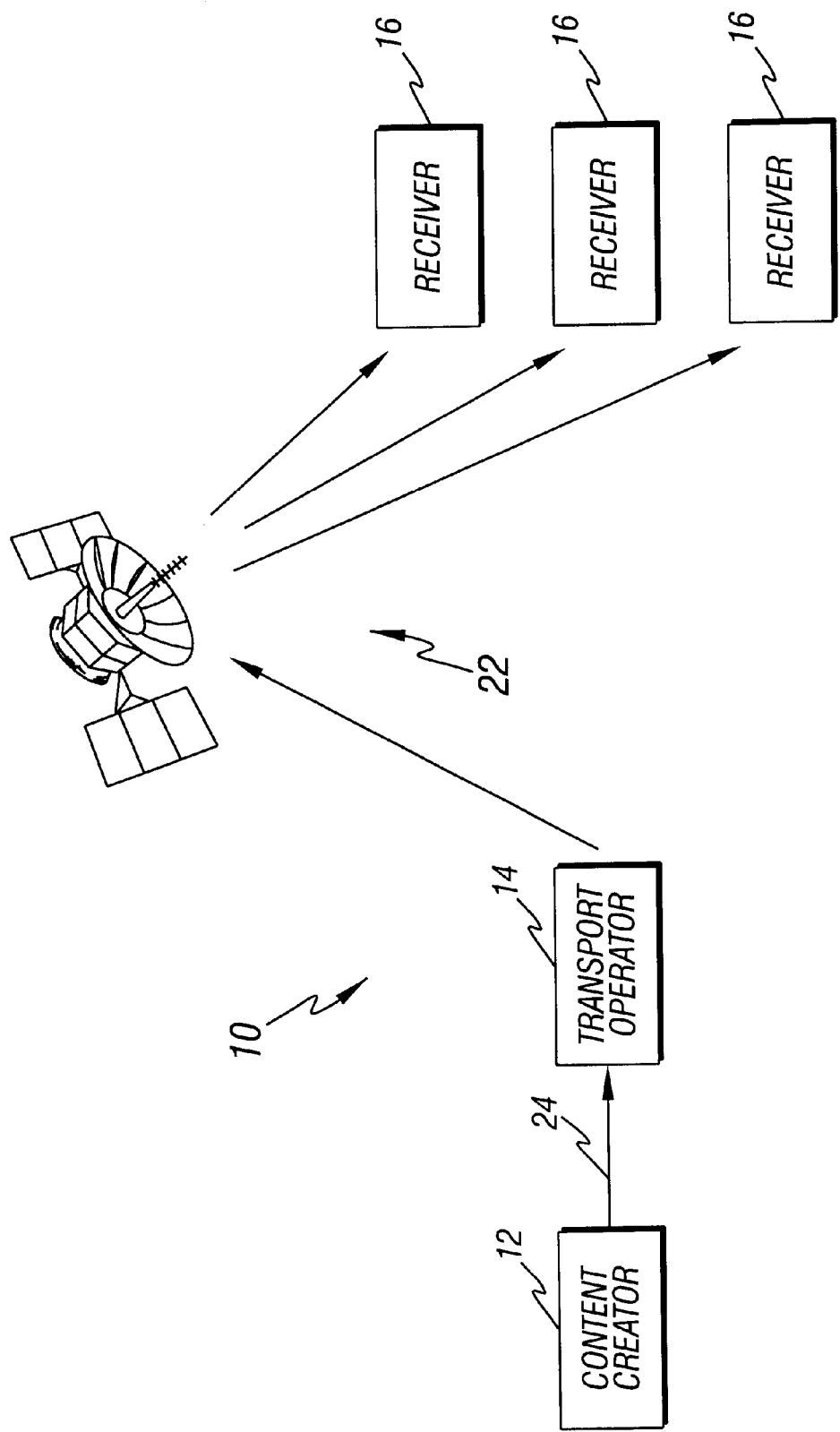
FIG. 1 is a block diagram of an embodiment of an information delivery system that communicates ancillary information associated with audio/video content.

Referring to FIG. 1, an information delivery system 10 according to one embodiment includes a content creator 12, a transport operator system 14, and a plurality of receivers 16. The receivers 16 may be located at various receiving sites, including homes, offices, entertainment facilities, or other locations. The content creator 12 originates enhancement data (or other types of ancillary information) and television content (or other types of content including A/V content) communicated to the transport operator system 14 over link 24. Enhancement data may include graphics (e.g., web pages, multimedia information, or other digital data files), presentation layout, and synchronization information. The combination of the enhancement data and A/V content may be referred to as enhanced A/V content. Other types of ancillary information may include program sub-titles, closed caption messages, emergency messages, and program guide information.

The transport operator system 14 provides an enhanced A/V content delivery infrastructure that may include terrestrial, cable, satellite, or other types of transmission facilities (either analog or digital). The A/V content and enhancement data may be transmitted over a transport medium 22, which may be a terrestrial, cable, satellite, or other type of link, to the receivers 16. FIG. 1 illustrates the transport medium 22 as satellite link. The receivers 16 may include televisions, set-top boxes, personal computers, or other types of systems adapted to receive A/V content and associated enhancement data or other types of ancillary information. In further embodiments, the receivers 16 may also include distribution systems such as geographic regional centers that receive enhanced A/V content for distribution in a predefined geographic region.

In accordance with some embodiments, the content creator 12 is capable of creating different layers of enhancement data for transmission to the multiple receivers 16, which may be of various types with different capabilities for receiving enhancement data. For example, the storage capacity, processing speed, and data transfer rates in the receivers 16 may vary. In addition to the receivers 16, other receiver platforms may also be coupled to the transport medium 22 to receive enhanced A/V content.

According to one embodiment, a receiver platform can selectively receive one or more layers of enhancement data, depending on its capabilities. Enhancement data may be associated with several alternatives, with each alternative including different numbers of layers. Thus, a relatively low-capacity receiver platform can choose to receive an alternative with a smaller number of layers, while a relatively high-capacity receiver platform can choose to receive an alternative with more layers to present more enhancement features to a viewer. Thus, a first alternative may include a first set of enhancement data, a second alternative may include a second set of enhancement data that includes the first set in addition to further data, a third alternative may include a third set of enhancement data that includes other sources of enhancement data, and so forth.

The multiple layers of enhancement data may be transmitted in a stream over the transport medium 22 by the transport operator system 14, with different receiver platforms capable of selecting different combinations of layers by choosing one of multiple alternatives of the enhancement data. With some embodiments of the invention, the layers of enhancement data do not need to be retransmitted as many times as there are alternatives. Thus, the layers of enhancement data may be transmitted in one stream with different receivers picking and choosing the layers to receive based on the desired alternative. Consequently, bandwidth on the transport medium 22 is not consumed by having to transmit different groups of enhancement data associated with different alternatives in separate transmissions.

Enhancement data according to the ATVEF Specification may include enhancements, with each enhancement including three components: an announcement, a resource, and a trigger. An ATVEF announcement indicates that enhancement data is being transmitted, a resource includes a file that contains the content of the enhancement data, and a trigger synchronizes the enhancement data with the A/V content transmission. An announcement may describe the location of both the resource stream and the trigger stream.

For each A/V channel (e.g., a TV channel), one or more enhancements may be offered as choices presented to the user, who can select which of the enhancements, if any, to view. In addition, each enhancement may have multiple alternatives (e.g., alternatives according to different languages). The ATVEF Specification may utilize a multicast protocol (e.g., IP multicast) to transmit the announcements, resource files, and triggers associated with the offered enhancements. IP is described in Request for Comment (RFC) 791, entitled "Internet Protocol," dated September 1981. An IP multicast protocol is described in RFC 1301, entitled "Multicast Transport Protocol," dated February 1992. RFCs may be available at the web site {http://www.ietf.org/rfc.html}. In addition, a one-way IP multicast transmission protocol (e.g., the Unidirectional Hypertext Transfer Protocol or UHTTP, described in the ATVEF Specification) may be used to deliver resource data.

Conventionally, ATVEF announcements arrive at a predetermined IP address and port. In the announcements, the locations of the resource and trigger streams specified in the ATVEF Specification may be described as IP addresses and ports where the resource files and trigger files may be found. The ATVEF announcement may be a Session Description Protocol (SDP) announcement, as described in RFC 2327, entitled "SDP: Session Description Protocol," dated April 1998.

Each ATVEF announcement is for a different enhancement, which may be an ATVEF presentation or application (e.g., a program or script). Examples may include a financial application, a sports application, advertising program, enhancement related directly to a TV show, and other presentations or application. In addition to locations of resource and trigger files, other information that may be included in an announcement are set forth below. Each announcement may include an identifier, such as a universally unique identifier (UUID), to identify the associated enhancement. A field in the announcement may indicate the bandwidth of the transmitted enhancement data, which may be expressed in kilobits per second (kbps). Another field may indicate an estimate of the cache storage that may be needed during playing of the enhancement. The bandwidth and cache storage fields may be used by a receiver platform to adequately judge whether or not it can successfully play an enhancement from beginning to end. Other fields that may be present in the announcement may include an identification of the language in which the enhancement data will be presented, start and stop times of the enhancement, and other types of information. The announcement may be separated into multiple sections to correspond to multiple alternatives of an enhancement. If the announcement is in the SDP format, then the multiple sections may be media sections.

In accordance with some embodiments of the invention, each of the alternatives may be identified with one or more sections, with each section referring to a source of resource data or trigger file. In such an embodiment, each source may correspond to a layer of enhancement data. Thus, for example, a first layer may include a source located at a first address, a second layer may include a source located at a second address, and so forth. Each of the alternatives in the announcement may refer to multiple layers of such data. Thus, for example, a first alternative may refer to a source at a first address, a second alternative may refer to a source at the first address and another source at a second address, and so forth. A receiver platform can choose one of the alternatives identified in an announcement based on the capacity of the receiver platform (e.g., its storage capacity, processing speed, data transfer rate, and so forth).

If protocols other than the ATVEF Specification is used in further embodiments, then announcements may refer to any indications provided by such other protocols of the presence of ancillary information. In addition, such other protocols may provide for files or packets that contain contents of the ancillary information and timing or synchronization information.

Figure 2:
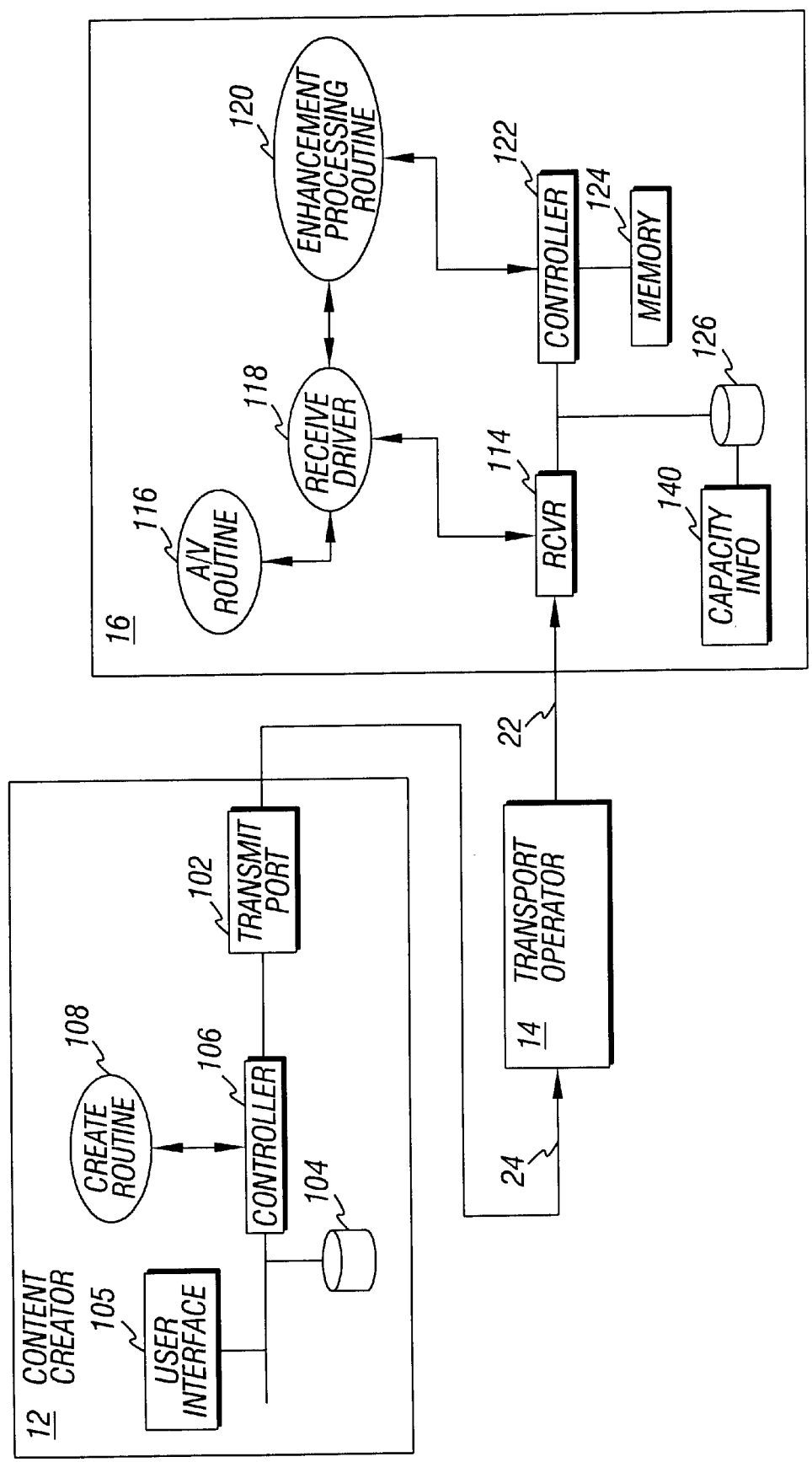
FIG. 2 is a block diagram of a content creator and a receiver platform according to one embodiment in the information delivery system of FIG. 1.

Referring to FIG. 2, components in the content creator 12 and a receiver platform (such as a receiver 16) are illustrated. The content creator 12 may include a transmitting port 102 to transmit data from the content creator 12 over the link 24 to the transport operator system 14. The received enhancement data may be processed by the transport operator system 14 for transmission to one or more receiver platforms. In the content creator 12, an enhancement data create routine 108 executable on a controller 106 is capable of creating enhancement data in layers according to some embodiments. The create routine 108 may initially be stored in a storage medium 104 and loaded by the controller 106 for execution. A user interface module 105 (comprising software and/or hardware components) may allow one or more operators or developers to enter requirements from which the layers of enhancement data are created.

In the receiver platform (e.g., receiver 16), a receiver module 114 is coupled to the transport medium 22. Data communicated to the transport medium 22 passes through the receiver module 114. Data received from the transport medium 22 passes through the receiver module 114 to a receive device driver 118 in the receiver platform. The receive device driver 118 may be capable of separating A/V content, which is passed to an A/V routine or application 116 to process the A/V content for presentation or distribution. The receive device driver 118 passes enhancement data to an enhancement processing routine 120. Thus, a stream received over the transport medium 22 is separated into A/V content and enhancement data, with the enhancement data sent to the enhancement processing routine 120 for further manipulation.

Software in the receiver platform, including the device drivers 118 and 120, the enhancement processing routine 120, and the A/V routine 116, are executable on a controller 122, which may be a microprocessor, a microcontroller, or other suitable control device. A memory 124 is coupled to the controller 122. Another storage device 126 (which may be, by way of example, a mass storage device such as a hard disk drive) may also be accessible by the controller 122. A file 140 containing information describing the capacity (e.g., available storage capacity, processing speed, transfer speed, etc.) of the receiving platform may be stored in the storage device 126. In accordance with some embodiments of the invention, the enhancement processing routine 120 is capable of examining announcements received through the receiver module 114 and receive device driver 118 to determine available alternatives associated with each enhancement. Based on the presented alternatives, the enhancement processing routine 120 can select one of the alternatives to receive.

In addition to the categories of the information listed above, an ATVEF announcement may also include a predetermined string, e.g., "a=type:tve", to identify itself as an announcement. For backward compatibility, a first type announcement according to conventional ATVEF systems may include the predetermined string. Although a first type announcement according to conventional ATVEF systems can specify multiple alternatives of an enhancement, layering of resource files in accordance with one embodiment is not provided. According to conventional ATVEF systems, a new alternative is defined each time a new source of data is referred to in an announcement.

In accordance with some embodiments of the invention, a second type announcement can be sent along with the first type announcement, with the second type announcement being capable of identifying multiple alternatives each capable of being associated with one or more layers (or sources) of resource data. The second type announcement may be sent without the predetermined string, e.g., "a=type:tve". Instead, the second type announcement may include another predetermined string, e.g., "a=type:x2tve" to identify that a new type of announcement has been received. A receiver platform that is capable of receiving the new type of announcement may be programmed to ignore first type announcements (those containing the string "a=type:tve", for example) having the same ATVEF enhancement identifier, UUID, as a corresponding second type announcement.

Figure 3:
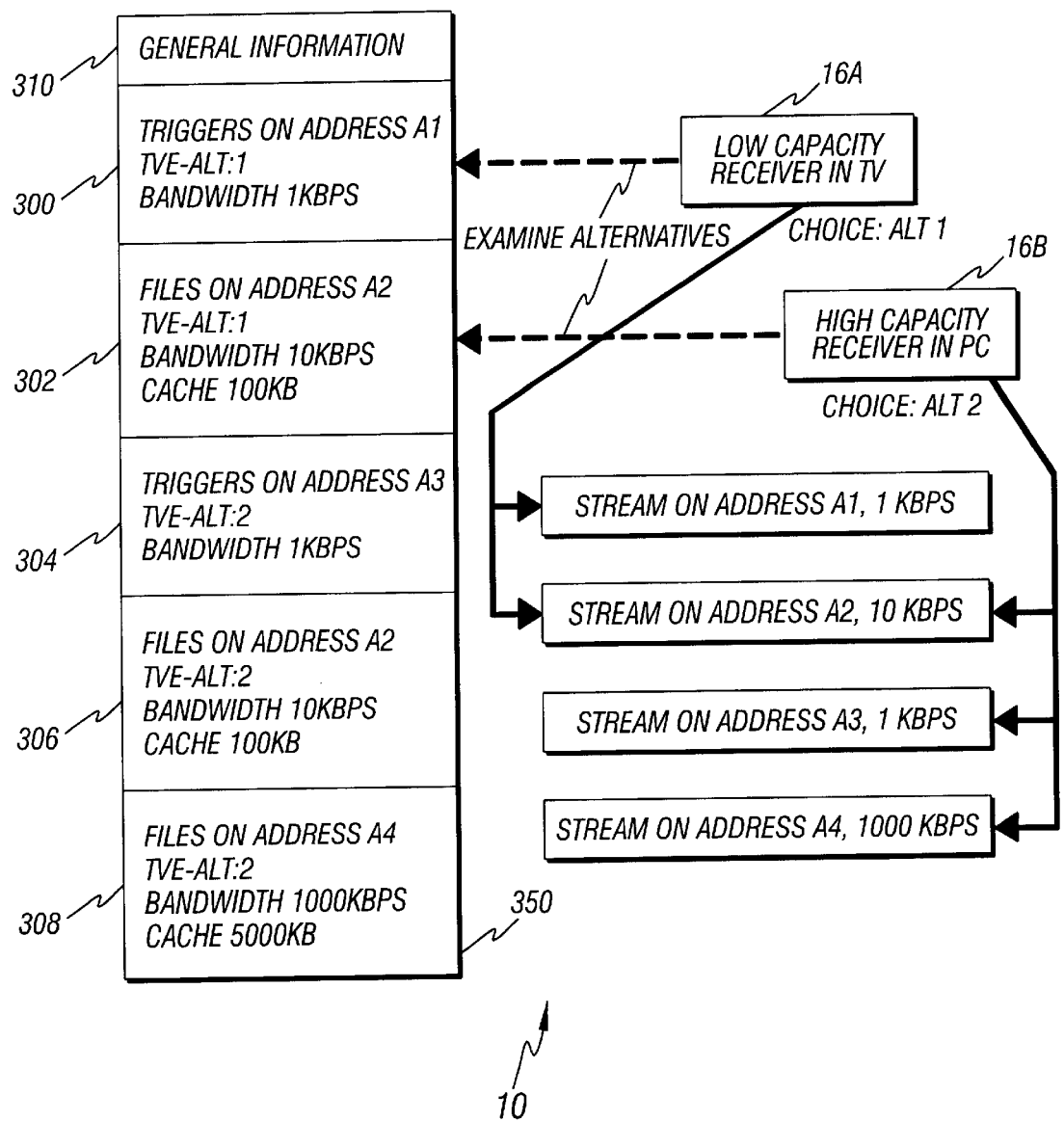
FIG. 3 illustrates receipt of layers of transmitted information in accordance with an embodiment by the receiver platform of FIG. 2.

Referring to FIG. 3, an example information delivery system 10 includes a relatively low-capacity receiver 16A and a relatively high-capacity receiver 16B. It is contemplated that additional receiver platforms with further varying capacities may also be included. In the illustrated example, two alternatives are presented, as identified by strings "tve-alt:1" and "tve-alt:2". In this embodiment, an Nth alternative may be identified with the string "tve-alt:N". As illustrated, an announcement 350 (of the second type) includes multiple sections 300, 302, 304, 306, 308, and 310. The section 310 may include general information, such as the identifier UUID of the enhancement and the second type of predetermined string, e.g., "a=type:x2tve" to identify that the received announcement is of the second type. The sections 300, 302, 304, 306 and 308 may be media sections according to the SDP format, for example.

Each of the sections 300, 302, 304, 306 and 308 points to one source of enhancement data (resource or trigger files) and can be associated with one of the multiple alternatives of the enhancement corresponding to the announcement 350. The section 300 identifies a trigger file located at address A1 and is associated with a first alternative as indicated by tve-alt:1. The section 300 can also indicate that the bandwidth associated with the trigger file is 1 kbps. The section 302 refers to resource files located at address A2 and is associated with the first alternative, as indicated by tve-alt:1. In addition, the section 302 also indicates that the bandwidth for receiving the resource files at address A2 is 10 kbps and the cache requirement is 100 kilobytes (kB). Bandwidth refers to the speed of data transfer that is needed to adequately receive and process the data. Cache requirement refers to the amount of storage that may be needed to store the enhancement data during presentation in a receiver platform. The bandwidth and cache storage requirements may be referred to as capacity requirements for receipt and processing of the enhancement data. Other types of capacity requirements may be included in further embodiments.

Sections 304, 306 and 308 are associated with the second alternative (as identified by tve-alt:2). The section 304 refers to a trigger file at address A3 (with a bandwidth of 1 kbps), the section 306 identifies resource files at address A2 (with a bandwidth of 10 kbps and cache requirement of 100 kB), and the section 308 refers to resource files at address A4 (with a bandwidth of 1000 kbps and cache requirement of 5000 kB). In the illustrated example, the section 306 associated with the second alternative refers to the same source (located at address A2) of resource files as the section 302 associated with the first alternative. In addition, the second alternative includes a second layer of resource files from the source at address A4.

The enhancement processing routine 120 in the receiver 16A (which may be a relatively low capacity receiver) examines the announcement 350 to determine which alternative to select. If the receiver 16A is unable to handle the requirements of the second alternative, then it selects the first alternative by receiving the stream on address A1 (the trigger of the first alternative) and the stream on address A2 (resource files associated with the first alternative). Another receiver 16B examines its received copy of the announcement 350 to determine which alternative to select. If the receiver 16B is capable of handling the second alternative, then it may choose to receive the trigger from the stream on address A3 and resource files from the streams on addresses A2 and A4. Additional alternatives may be presented in the announcement 350. In the illustrated example, the low-capacity receiver 16A may be a TV, while the high-capacity receiver 16B may include a personal computer.

Figure 4:
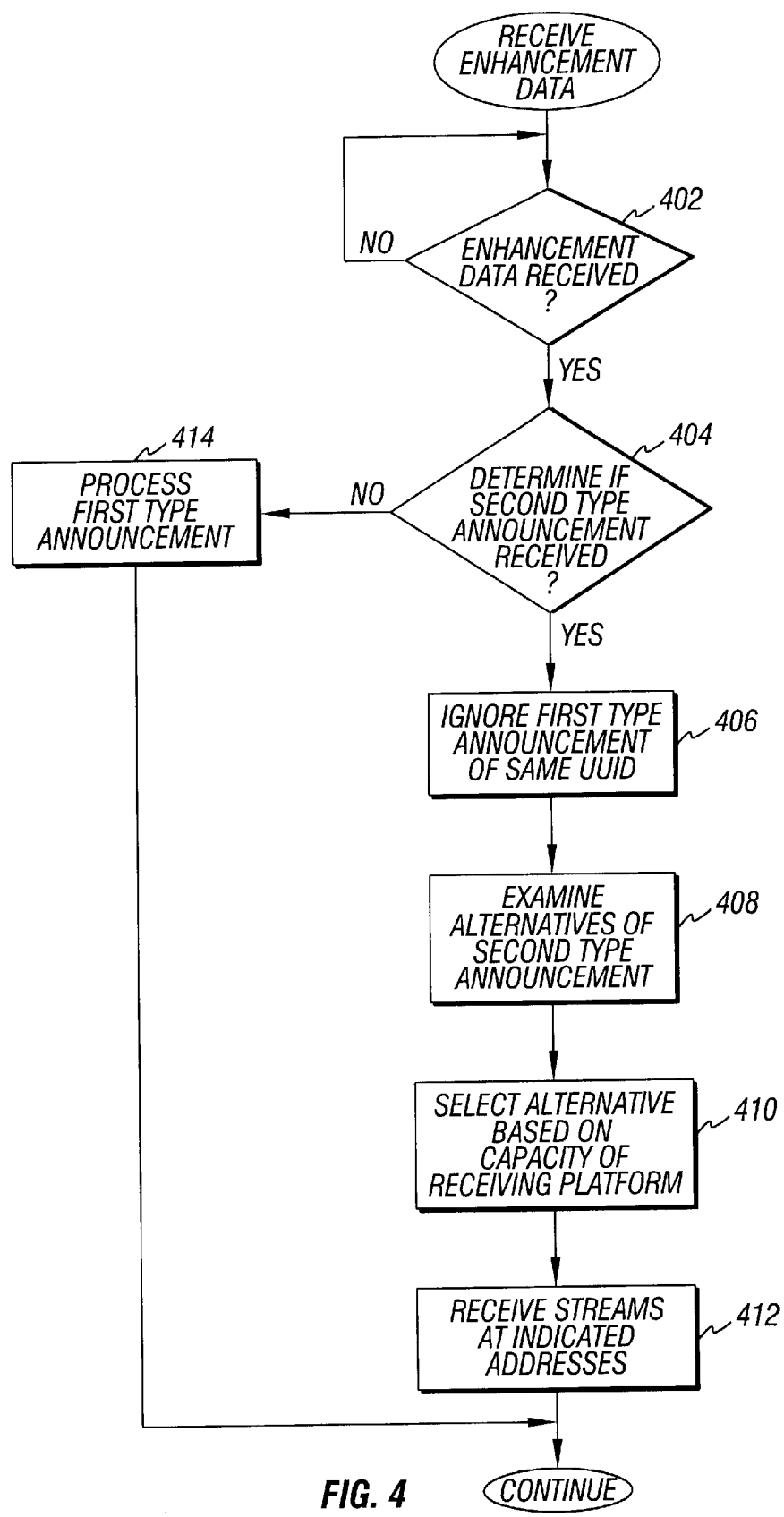
FIG. 4 is a flow diagram of an enhancement processing routine in accordance with an embodiment in the receiver platform of FIG. 2.

Referring to FIG. 4, the tasks performed by the enhancement processing routine 120 in accordance with one embodiment of the invention is described. The enhancement processing routine 120 determines if enhancement data has been received (at 402). This may be performed by determining if announcements have been received which may be packets containing predetermined string "a=type:tve" or "a=type:x2tve". If so, the routine 120 determines if one or more second type announcements have been received (at 404), e.g., announcements with the string "a=type:x2tve". If not, then first type announcements, e.g., those with the string "a=type:tve", are processed (at 414) according to conventional ATVEF techniques. If a second type announcement has been received, then any first type announcement having the same enhancement identifier (UUID) is ignored (at 406) by the routine 120. Next, the routine 120 examines (at 408) alternatives presented in the second type announcement. Based on the information contained in the sections associated with the different alternatives, the routine 120 selects (at 410) one of the alternatives based on the capacity of the receiving platform, as determined from the capacity information file 140 (FIG. 2), for example. The capacity information file 140 may contain information identifying the capabilities of the receiver platform, which may be compared by the processing routine 120 to the bandwidth and cache requirements presented in the second type announcement 350. Next, the routine 120 receives (at 412) the streams at the indicated addresses that are associated with the selected alternatives.

Figure 5:
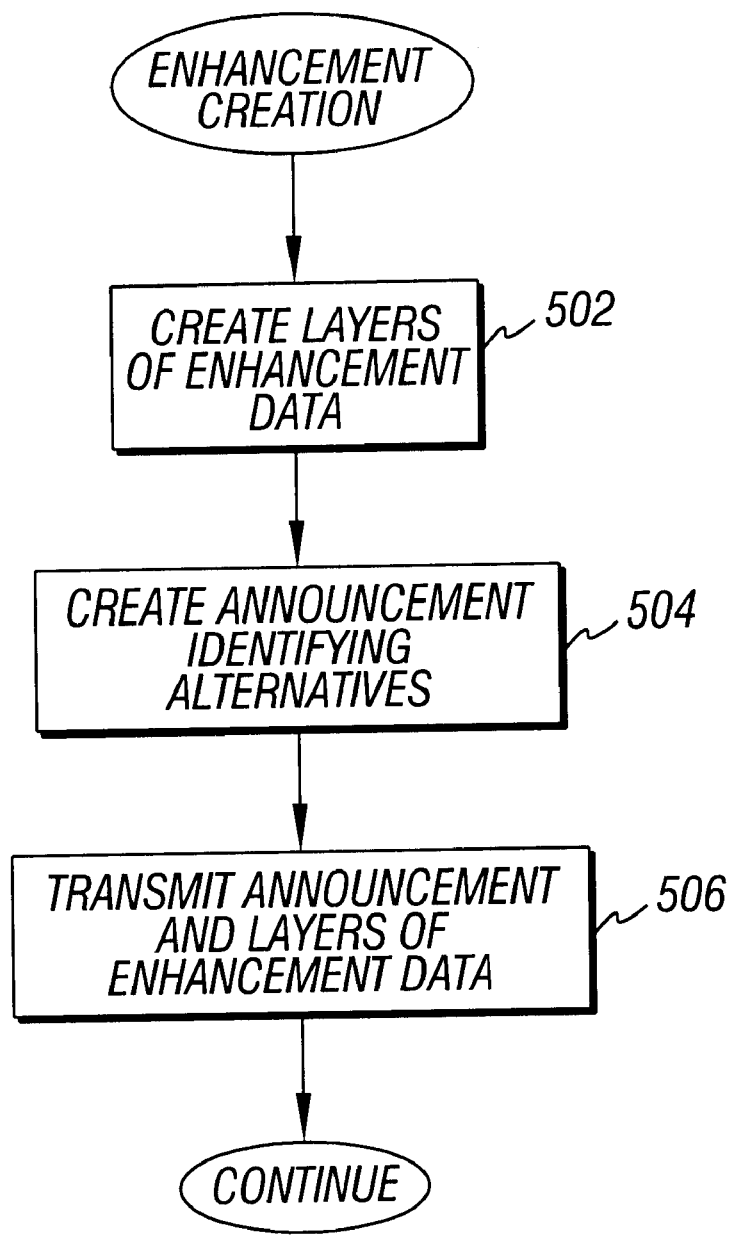
FIG. 5 is a flow diagram of a routine in the content creator of FIG. 2 for creating layers of ancillary information in accordance with an embodiment.

Referring to FIG. 5, an enhancement data creation process performed by the enhancement data create routine 108 in the content creator 12 is illustrated. Based on desired enhancement programming, which may be specified by operators through the user interface module 105 and stored in the storage device 104, the create routine 108 creates (at 502) the layers of enhancement data. As discussed above, each layer may be associated with a different source of resource and trigger files. Next, the create routine 108 creates (at 504) one or more announcements corresponding to the enhancements being transmitted. Each announcement may include multiple sections to identify multiple alternatives and associated sources of files. The announcement also includes information identifying capacity requirements including bandwidth information and cache storage information. The announcements are transmitted (at 506) by the content creator 12 of the transport operator system 14 for distribution.

Some embodiments, of the invention may have one or more of the following advantages. For higher capacity receivers, higher quality enhancement data may be received from a stream, while alternative enhancement data having reduced features may be received by lower capacity receivers from the same stream. By layering the enhancement data, a wider audience may be reached without sacrificing the features and options that may be presented to higher capacity receiver platforms.

Various software (formed of modules, routines, or other layers, for example) may be stored or otherwise tangibly embodied in one or more machine-routable storage media in devices of the information delivery system. Storage media suitable for tangibly embodying software instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD (compact disc) or DVD (digital video disc) disks. The instructions stored in the one or more storage media when executed cause devices in the information delivery system to perform programmed acts.

The software can be loaded into devices in the information delivery system in one of many different ways. For example, instructions or other code segments stored on one or more storage media or transported through a network interface card, modem or other interface mechanism may be loaded into the system and executed to perform programmed acts. In the loading or transport process, data signals that are embodied as carrier waves are transmitted over telephones, network lines, wireless links, cables, and the like, may communicate the instructions or code segments to devices in the information delivery system.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating enhancement data including announcements, resource files, and trigger files associated with audio/video content according to a protocol without layering capability, comprising:

detecting, in a receiver platform, for a first announcement and a second announcement, the first announcement being associated with non-layered enhancement data, and the second announcement being associated with layered enhancement data having a plurality of layers, each layer including one or more sources of trigger files or one or more sources of resource files;

examining alternatives presented in the second announcement, the alternatives containing different collections of the layers of enhancement data;

selecting one of the alternatives in the second announcement based on the capacity of the receiver platform; and receiving one or more layers containing respective trigger files and resource files associated with the selected alternative.

2. The method of claim 1, wherein detecting for the second announcement includes detecting for an announcement including a plurality of sections, each section referring to a layer of enhancement data.

3. The method of claim 2, wherein examining the alternatives in the second announcement includes determining which sections of the announcement are associated with corresponding alternatives.

4. The method of claim 3, wherein the determining includes determining media sections of a Session Description Protocol announcement associated with each alternative.

5. The method of claim 3, further comprising determining if the receiver platform is capable of receiving one of the alternatives.

6. The method of claim 1, wherein receiving the one or more layers of enhancement data includes receiving enhancement data according to an Advanced Television Enhancement Forum Specification.

7. A receiver system for communicating enhancement data including announcements, resource files and trigger files associated with audio/video content according to a protocol without layering capability, comprising:

a receive module to receive first and second announcements, a first announcement associated with non-layered enhancement data, a second announcement associated with layered enhancement data, the layered enhancement data including a stream of a plurality of layers of enhancement data associated with a plurality of alternatives, each alternative including one or more of the layers, each layer including one or more sources of trigger files or one or more sources of resource files; and a controller, upon detection of a second announcement, to select one of the alternatives of the layered enhancement data based on the capacity of the receiver system and to receive the one or more layers associated with the selected alternative including the respective resource files and trigger files.

8. The receiver system of claim 7, further comprising a storage device containing information describing the capacity of the receiver system.

9. The receiver system of claim 7, wherein the controller identifies the alternatives presented in the second announcement.

10. The receiver system of claim 7, wherein each alternative of enhancement data includes information identifying one or more capacity requirements.

11. The receiver system of claim 10, wherein the one or more capacity requirements include a storage capacity requirement.

12. The receiver system of claim 10, wherein the one or more capacity requirements include a bandwidth requirement.

13. The receiver system of claim 7, wherein the enhancement data is according to an Advanced Television Enhancement Forum Specification.

\* \* \* \* \*